US008654395B2

(12) United States Patent  
Bestmann

(10) Patent No.: US 8,654,395 B2  
(45) Date of Patent: Feb. 18, 2014

(54) METHOD AND TEST ELEMENT FOR DETERMINING CHARACTERIZATION DATA OF A PRINTING PROCESS AND APPARATUS FOR CARRYING OUT THE METHOD

(75) Inventor: Günter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 428 days.

(21) Appl. No.: 13/026,432

(22) Filed: Feb. 14, 2011

(65) Prior Publication Data

US 2011/0199626 A1  Aug. 18, 2011

(30) Foreign Application Priority Data

Feb. 12, 2010 (DE) .......................... 10 2010 007 858

(51) Int. Cl.
*G06F 15/00* (2006.01)
*G06K 1/00* (2006.01)

(52) U.S. Cl.
USPC ............ 358/1.9; 358/518; 358/500; 358/504; 101/484

(58) Field of Classification Search
USPC .................. 358/1.9, 500, 518, 504; 101/484
See application file for complete search history.

(56) References Cited

U.S. PATENT DOCUMENTS

| 5,255,085 | A | 10/1993 | Spence |
| 5,315,380 | A * | 5/1994 | Ingraham et al. ............. 358/500 |
| 7,032,517 | B2 * | 4/2006 | Bestmann ..................... 101/484 |
| 7,312,893 | B2 | 12/2007 | Bestmann et al. |
| 7,423,778 | B2 | 9/2008 | Hersch et al. |
| 7,505,173 | B2 * | 3/2009 | Viturro et al. .................. 358/1.9 |

(Continued)

FOREIGN PATENT DOCUMENTS

| DE | 4 29 267 A1 | 5/1926 |
| DE | 43 18 044 A1 | 12/1994 |

(Continued)

OTHER PUBLICATIONS

Zuffi et al., "Spectral-Based Printer Modeling and Characterization", Journal of Electronic Imaging, vol. 14, No. 2, Apr.-Jun. 2005 pp. 23008-1-023008-9, XP001237093.

(Continued)

*Primary Examiner* — Twyler Haskins
*Assistant Examiner* — Michael Burleson
(74) *Attorney, Agent, or Firm* — Laurence A. Greenberg; Werner H. Stemer; Ralph E. Locher

(57) ABSTRACT

A method for calculating characterization data of a printing process, is more manageable and less complicated than previously-known methods, in which determining printing tables for CMYK printing systems with special colors or for multicolor systems easily becomes unwieldy and complicated because of necessary colored areas in test elements. A test element supplies actual spectral data. By using subsets of this actual data, tonal value curves or tonal value gain curves, parameters of a model of the printing process for determining spectra of overprinted printing inks and adapted input variables, are determined in a calculating device in accordance with the model, taking into account the tonal value gain, to determine corrected tonal values or their spectra. Then only a few colored areas are needed to calculate characterization data. A test element for determining characterization data of a printing process and an apparatus for carrying out the method are also provided.

19 Claims, 3 Drawing Sheets

(56) References Cited

U.S. PATENT DOCUMENTS

| | | |
|---|---|---|
| 7,813,014 B2 | 10/2010 | Krabbenhöft |
| 2005/0150411 A1 | 7/2005 | Bestmann |
| 2005/0238374 A1 | 10/2005 | Yoshida |
| 2011/0013206 A1* | 1/2011 | Mestha et al. ............ 358/1.9 |

FOREIGN PATENT DOCUMENTS

| | | |
|---|---|---|
| DE | 10 2004 001 937 A1 | 8/2005 |
| DE | 10 2007 007 628 A1 | 8/2008 |
| DE | 10 2007 032 944 A1 | 1/2009 |
| EP | 0 538 901 A2 | 4/1993 |
| EP | 1 275 502 A1 | 1/2003 |
| WO | 2005013188 A1 | 2/2005 |

OTHER PUBLICATIONS

German Patent and Trademark Office Search Report, Dated Oct. 28, 2010.

* cited by examiner

METHOD AND TEST ELEMENT FOR DETERMINING CHARACTERIZATION DATA OF A PRINTING PROCESS AND APPARATUS FOR CARRYING OUT THE METHOD

CROSS-REFERENCE TO RELATED APPLICATION

This application claims the priority, under 35 U.S.C. §119, of German Patent Application DE 10 2010 007 858.1, filed Feb. 12, 2010; the prior application is herewith incorporated by reference in its entirety.

BACKGROUND OF THE INVENTION

Field of the Invention

The invention relates to the field of electronic reproduction technology and deals with a method for determining characterization data for use in a printing process, in which initially at least one test element having a number of colored areas is printed on a printing material, with tonal values of at least one printing ink being assigned to the colored areas, the colored areas of the at least one test element being measured spectrally with a measuring instrument to determine measured results, and the measured results being stored as actual spectral data. The invention also relates to a test element for determining characterization data and an apparatus for carrying out the method using a test element.

In reproduction technology, printing originals for printed pages are produced, all of which contain elements to be printed such as texts, graphics and images. In the case of a colored print, a separate printing original is produced for each printing ink and contains all of the elements which are to be printed in the respective color. In four color printing, those are the printing inks cyan (C), magenta (M), yellow (Y) and black (K). The printing originals separated in accordance with printing inks are also called color separations. The printing originals are generally screened and, using an exposer, are exposed onto films, with which printing plates for the printing of large editions are then produced. Alternatively, the printing originals can also be exposed directly on printing plates in specific exposure devices or they are transferred directly as digital data to a digital printing press. There, the printing original data are then exposed onto printing plates, for example by using an exposure unit integrated in the printing press, before the edition printing or print run begins immediately thereafter. There are also digital printing presses which do not need any printing plates since they operate, for example, on the electrophotographic printing principle or with inkjet printing.

According to the current prior art, the printing originals are reproduced electronically. Images are scanned in a color scanner and stored in the form of digital data. Texts are produced with text processing programs and graphics with drawing programs. The image, text and graphics elements are assembled to form a printed page by using a layout program. The data from a plurality of printed pages is combined with data from further elements, such as register crosses, cutting marks and folding marks and also print control areas, to form printing originals for a printed sheet. The data formats used nowadays to describe the printing originals are largely the page description languages PostScript and PDF (Portable Document Format). Before the recording of the printing originals, the PostScript or PDF data is converted in a raster image processor (RIP) into color separation values for the color separations C, M, Y and K in a first step. In the process, for each image point, four color separation values are produced as tonal values in a value range from 0 to 100%. The color separation values are a measure of the color intensities with which the four printing inks cyan, magenta, yellow and black are printed on the printing material. In special cases, in which more than four colors are printed, each image point is described by as many color separation values as there are printing inks. The color separation values can be stored, for example, with 8 bits as a data value for each image point and printing ink, with which the value range from 0% to 100% is subdivided into 256 tonal value steps.

The colors of the elements of a printed page are usually not defined straight away in the CMYK color system of the printing inks but, as a rule, in another color system. Thus, the images are broken down in a scanner through the use of color filters into the color components red, green and blue (RGB), that is to say into the components of a three-dimensional color space. Before the recording of the printing originals on color separation films or on printing plates, the image data therefore has to be transformed from the RGB color space of the scanner into the CMYK color space of the printing process to be used. The same is true of the digitally photographed images.

Such color space transformations are needed in reproduction technology because the devices and processes used have specific restrictions and special features in the rendering and reproduction of the colors, and those properties are different in all of the devices and processes. Therefore, for various devices and processes such as scanners, monitors, proofing devices, printing processes and so on, there are different color spaces which in each case describe the color properties of the device or process optimally and which are designated device dependent color spaces. Besides the device dependent color spaces, there are also device independent color spaces, which are based on the human viewing characteristics of a so-called normal observer. Such color spaces are, for example, the CIE 1931 XYZ color space (XYZ color space for short) defined by the standardization commission CIE (Commission Internationale d'Eclairage) or the CIE 1976 L*a*b* color space (Lab color space for short), with the Lab color space being more common in technology. The measurement of the XYZ or Lab color components will be sufficient in order to find out whether two colors will be sensed by the human eye as being identical or different. The Lab color components form a three-dimensional color space having a lightness axis (L) and two color axes (a, b), which can be imagined in the plane of a color circle, through the center of which the lightness axis runs. The Lab color components are related to the XYZ color components through nonlinear conversion equations.

A device or color processing process can be characterized with respect to its color characteristics by all of the possible value combinations of the associated device dependent color space (tonal values) being assigned the Lab color components (color values) seen by a human in the colors produced with those tonal value combinations. For a printing process, the various CMYK tonal value combinations each produce a different printed color. Using a color measuring instrument, it is possible to determine the Lab components of the printed colors and assign them to the CMYK tonal value combinations. Such an assignment, which places the device dependent colors produced by a device or process in a relationship with a device independent color space (XYZ or Lab), is also designated a color profile or an output color profile in the case of a printing process. The definition and data formats for color profiles have been standardized by the ICC (International Color Consortium) (Specification ICC.1 2006-05) and normalized by the International Organization for Standardization or ISO (ISO ISO15076-1:2005). In an ICC color profile, the assignment of the color spaces in both directions is stored, for instance the assignment Lab=f1(CMYK) and the inverted assignment CMYK=f2(Lab). The assignment defined with a color profile can be implemented with the aid of a look-up table. If, for example, the CMYK tonal values of a printing process are to be assigned the Lab color values, the look-up table must have a storage space in which the associated Lab color values are stored for each possible value combination of the CMYK tonal values. However, that simple assignment method has the disadvantage that the look-up table can become very large. If each of the CMYK tonal values has 256 density steps, there are $256^4$=4,294,967,296 possible value combinations of the CMYK tonal values. The look-up table must therefore have 4,294,967,296 storage cells each having a length of 3 bytes or 6 bytes (in each case one byte or two bytes for L, a, b). In order to reduce the size of the look-up table, a combination of look-up table and interpolation methods is therefore employed to describe a color profile and to implement a corresponding color space transformation. Only the associated Lab color components for a relatively coarse, regular grid of reference points in the CMYK color space are stored in the look-up table. For CMYK tonal values which lie between the grid points, the Lab color values to be assigned are interpolated from the stored Lab color values of the adjacent reference points.

When special color or multicolor systems are used, such as Hexachrome® from the Pantone company, the printable tonal values, as distinct from the CMYK combinations, are built up from a number of further printing inks, so that the ICC color profiles become correspondingly more comprehensive.

As described, for the purpose of color separation, specific look-up printing tables (ICC color profiles) are used, in which additionally process-induced boundary conditions, such as the color build-up (total area coverage, maximum black, black build-up) and the depiction of non-printable color values (gamut mapping) are incorporated. While look-up printing tables for CMYK systems can be calculated well with the conventional colorimetric methods, that easily becomes unwieldy and complicated for systems with special colors and multicolor systems.

The look-up printing tables are calculated in that case from the characterization data of a printing process. Characterization data is the definition of a unique relationship between digital tonal values and measured color values in the print (CMYK tonal values/CIEXYZ or CIELAB color values). In particular, in that case the measured color values can be stored as spectra. The characterization data could also be used for process control and process calibration.

The characterization data for CMYK systems is determined in the prior art by using a test element corresponding to ISO 12642-2:2006 or by using corresponding manufacturer-specific test elements. That is necessary, in particular, for multicolor systems.

Thus it is known, for example, from Published German Patent Application DE 10 2004 001 937 A1, corresponding to U.S. Pat. No. 7,032,517, to create four test forms in order to determine an ICC color profile, to obtain characterization data from those test forms in each case and then to create corresponding look-up tables which describe the assignment of the color values from the device independent color space into the printing color space. The use of four test forms is attributed in that case to the fact that special colors are to be replaced by the use of secondary printing inks. Furthermore, matrix operations are proposed in that case by way of example, in order to take into account nonlinear changes in the tonal value steps, i.e. graduation corrections are additionally taken into account, for example as a function of tonal value gains of the individual printed dots.

SUMMARY OF THE INVENTION

It is accordingly an object of the invention to provide a method and a test element for determining characterization data of a printing process and an apparatus for carrying out the method, which overcome the hereinafore-mentioned disadvantages of the heretofore-known methods, elements and apparatuses of this general type and which are more manageable and less complicated than the previously known methods.

With the foregoing and other objects in view there is provided, in accordance with the invention, a method of the generic type in which at least one test element is formed, for example on a test form and, through the use of this test form, a printing material is printed in a printing press. Alternatively, this test element can also be depicted in a region of the printing original and the printing form which is not to be used. The printing press can, for example, be an electrophotographic printing press, an offset printing press or the like.

This at least one test element can be measured with a spectrophotometer and corresponding spectral measured results can be determined as measured results. These measured results can then be stored as actual spectral data.

A first tonal value gain can be determined on the basis of a first subset of this stored actual data, for the associated tonal values of the colored areas of the first subset. Alternatively or additionally, a tonal value curve can also be determined for this first subset.

Since this tonal value gain is firstly determined once for individual, specific tonal values, provision is further made for these first tonal value gains or the associated tonal values to be used to determine a first tonal value gain curve or tonal value curve through the use of interpolation. In this case, the tonal value curve is to be understood, in particular, to mean a curve for representing the actual spectral data as a function of the predefined tonal values, i.e. in particular an actual/desired comparison.

Furthermore, at least one second subset of the actual data is used to determine at least one parameter of a model for calculating color values of the printing process. Through the use of a comparison of calculated color values based on the model with measured color values, for example from the second subset or else from a plurality of subsets of the test element or else from various test elements, the parameters can be optimized through the use of an iterative adaptation, reducing the difference from the comparison.

Furthermore, the tonal value gain curve or tonal value curve from the first data subset is to be used to correct the assignment of tonal values of the printing inks to printed color values or the spectra of the latter. This correction curve is then intended to be used to calculate the corresponding characterization data of the printing process. For instance, look-up tables can be produced from this correction curve. In particular, in this way a more accurate model of the printing process can be achieved, which permits sufficiently exact calculation of the characterization data using a smaller test element.

As opposed to the sole procedure for determining color profiles through interpolated tonal values or tonal value gain curves, in this case, through the model of the printing process, it is possible to take into account physical boundary conditions of the printing process itself which are actually present and not necessarily known individually during the determination of the characterization data. In particular, it is now possible for tonal value gains to be taken into account more accurately.

Since, through the use of the model used, these physical properties can be taken into account, in order to determine the first tonal value gain curve or tonal value curve through the use of interpolation, it is no longer necessary to use a particularly large number of colored areas as a basis for their determination. The number of colored areas within a test element can therefore be limited by this method. This likewise applies to the determination of all of the necessary characterization data.

In accordance with another mode of the invention, provision is made for the model used to be the spectral Yule-Nielsen Neugebauer model, preferably the segmented spectral Yule-Nielsen Neugebauer model and, through the use of at least the first or second subset, for a factor n as a parameter for modeling the optical point enlargement to be determined iteratively. Thus, through the use of an iterative method, a model can be determined which describes an optical point enlargement and permits a more accurate assignment of tonal values to spectrally determined color values even in regions in which no appropriate colored areas have been printed.

In accordance with a further mode of the invention, provision is made for the first subset of the actual spectral data to be used to calculate densitometric, colorimetric or else spectral first tonal values or tonal value gains. In the case of special colors, spectral tonal values or tonal value gains should preferably be calculated. In particular, it is also possible, exclusively in the case of the colored areas which have color values of special colors, for spectral tonal values or tonal value gains to be calculated but, in the remaining colored areas, for densitometric, colorimetric or spectral tonal values or tonal value gains to be calculated. In particular, corresponding curves can be determined from these determined or calculated tonal values or tonal value gains, for example by interpolation. In general terms, calculated spectral tonal values are preferred, however.

In accordance with an added mode of the invention, provision is made for the first subset to be actual spectral data which are picked up from color wedges that are preferably formed of colored areas which are exclusively based on one printing ink and preferably on tonal values with spacings of 10% from one another. Including a zero percentage value, this results, for example for a four color print, in a total of 44 colored areas. If six printing inks are used, then the number rises to 66 colored areas which are used to determine first tonal value gain curves or tonal value curves through the use of interpolation.

In accordance with an additional mode of the invention, provision is made for the second subset to be data from colored areas which are formed by the overprinting of printing inks being used. The printing inks used for this purpose are printed in accordance with tonal values which are selected from a predefined selection of reference points. The selection of reference points should preferably have a total of k reference points. The individual colored areas are then formed by the printing inks being overprinted in accordance with every possible combination of the reference points. If m printing inks are used, the result is thus $k^m$ combinations of overprinted printing ink coverages.

The reference points 0%, 40% and 100% are preferably presented for selection, which, for a four color process, results in a total of 81 further colored areas for the determination of the second subset of spectral data. In the case of a five color process, the result is then additionally 243 colored areas.

In order to determine the characterization data of a four color printing process, a total of 44+81=125 colored areas are thus necessary, which is substantially fewer than the colored areas according to the prior art (according to ISO 12642-2, typically 1617 colored areas are used).

With the objects of the invention in view, there is also provided, as an inventive development of the method, at least one test element having colored areas in color wedges to determine the data of the first subset and colored areas to determine the data of the second subset, in which the set of colored areas for determining the first or second subset is reduced by the colored areas which are already being used to determine the second or first subset. These colored areas should then be printed in only one of the two sets but used to determine both subsets. Alternatively, colored areas for determining the first or second subset which are based on the same tonal values should be used both for determining the first and also the second subset, with provision being made, in particular, for averaging for multiply printed colored areas.

Thus, either a reduction in the necessary colored areas in the test element can be provided or else the accuracy can be increased.

For a four color printing process, for example, four white areas having 0% ink coverage can be struck out from the first subset and, to determine this zero percentage value, only the white area having 0% area coverage for all of the overprinted color combinations can be taken from the set of colored areas which is used for the determination of the second subset. Likewise, from the colored areas for determining the second subset, those which contain only one printing ink, in this case, for example, 40% and 100%, can be struck out.

A minimal test element then is formed of 40 colored areas for determining the first data and 73 colored areas for determining the second data. From the second set of colored areas, a colored area (white) is also used to determine the first subset and, from the first set of colored areas, eight colored areas (4×40% and 4×100%) are also used to determine the second subset. Such a minimal test element then is formed of a total of 113 colored areas for a four color print.

In accordance with yet another mode of the invention, provision is made for the characterization data to be stored and, at least by using this characterization data, for a color profile of the printing process to be created, with the intention being to use this color profile for the color control of a printing press using the printing process.

With the objects of the invention in view, there is furthermore independently provided a test element for determining characterization data, preferably for use in the described method according to the invention, in which the test element has a first set of colored areas according to a color wedge, the colored areas in each case being formed with only one printing ink and the tonal values used as a basis having a predefined spacing from one another which, for example, is 10% of the tonal value.

In accordance with another feature of the invention, the test element is to have a second set of colored areas which are formed by overprinting the printing inks, with the printing inks in this case being printed in accordance with tonal values which are selected from a predefined selection of k reference points. Preferably, three reference points, for example 0%, 40%, 100%, can be predefined in this case.

Furthermore, the test element is built up in such a way that the first set of colored areas is reduced by those colored areas which are already contained in the second set no longer being provided and/or by colored areas in the second set which are already contained in the first set no longer being used and thus no longer being printed either.

In a preferred embodiment of this test element, provision is made that, from the first set of colored values, those colored areas are left out which have precisely no coverage and no printing ink, i.e. have a coverage of 0% and correspond to a tonal value of 0% and/or that, from the second set, those colored areas are left out which are built up exclusively from one printing ink. This means, for example, that a colored area from the second set in which 40% magenta but 0% of every other printing ink are contained, is no longer provided for use.

With the objects of the invention in view, there is concomitantly provided an apparatus which is suitable to carry out the method described above, using a corresponding test element.

The apparatus includes a printing press which is constructed in such a way that printing materials can be printed with at least one test element according to the invention and where, furthermore, a measuring device is provided which is able to determine spectral data from colored areas of the test element by measurement. In this case, a spectrophotometer is provided as the measuring device.

The apparatus further includes a storage device for storing the actual spectral data, the storage device being implemented, in particular, in such a way that it is able to store the data subsets of the spectral data which, to some extent, are assigned to different colored areas or different subregions of the test element.

Furthermore, a tonal value gain calculating device for calculating tonal value curves or tonal value gain curves from a first subset of the stored actual spectral data is provided. This is to be understood to mean that the tonal value gain calculating device determines color values or spectra from the measured actual data from a first subregion of the test element and assigns these color values or spectra to the tonal values on which the individual colored areas are based. This is possible firstly in the form of a direct assignment of the colors or in the form of a tonal value gain which describes the deviation of the measured colored values from envisaged color values.

The apparatus additionally includes a further calculating device for calculating spectra for tonal value combinations in accordance with a model, in particular in accordance with a Yule-Nielsen Neugebauer model, more preferably in accordance with a segmented spectral Yule-Nielsen Neugebauer model, with the calculating device assigning spectra to the tonal value combinations of the printing process in accordance with this model. In this case, the calculating device determines at least one parameter of the model while taking into account the tonal values or the tonal value curve which has been determined in the tonal value gain calculating device. In this case, this can, in particular, be the factor n in the spectral Yule-Nielsen Neugebauer equation, which is intended to describe the growth of the tonal value as a result of enlargement. The calculating device determines these parameters, in particular, iteratively through the use of an optimization of the parameter, so that the tonal values calculated from the model agree as well as possible with the tonal value curve from the tonal value gain calculating device. For this purpose, the calculating device can, in particular, have a comparison and optimization element.

A further calculating device is provided in order to calculate characterization data of the printing process on the basis of the model, through the use of a tonal value gain curve which has been determined in the tonal value gain calculating device. In particular, for this purpose the calculating device can be a constituent part of the calculating device for calculating spectra.

Other features which are considered as characteristic for the invention are set forth in the appended claims.

Although the invention is illustrated and described herein as embodied in a method and a test element for determining characterization data of a printing process and an apparatus for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
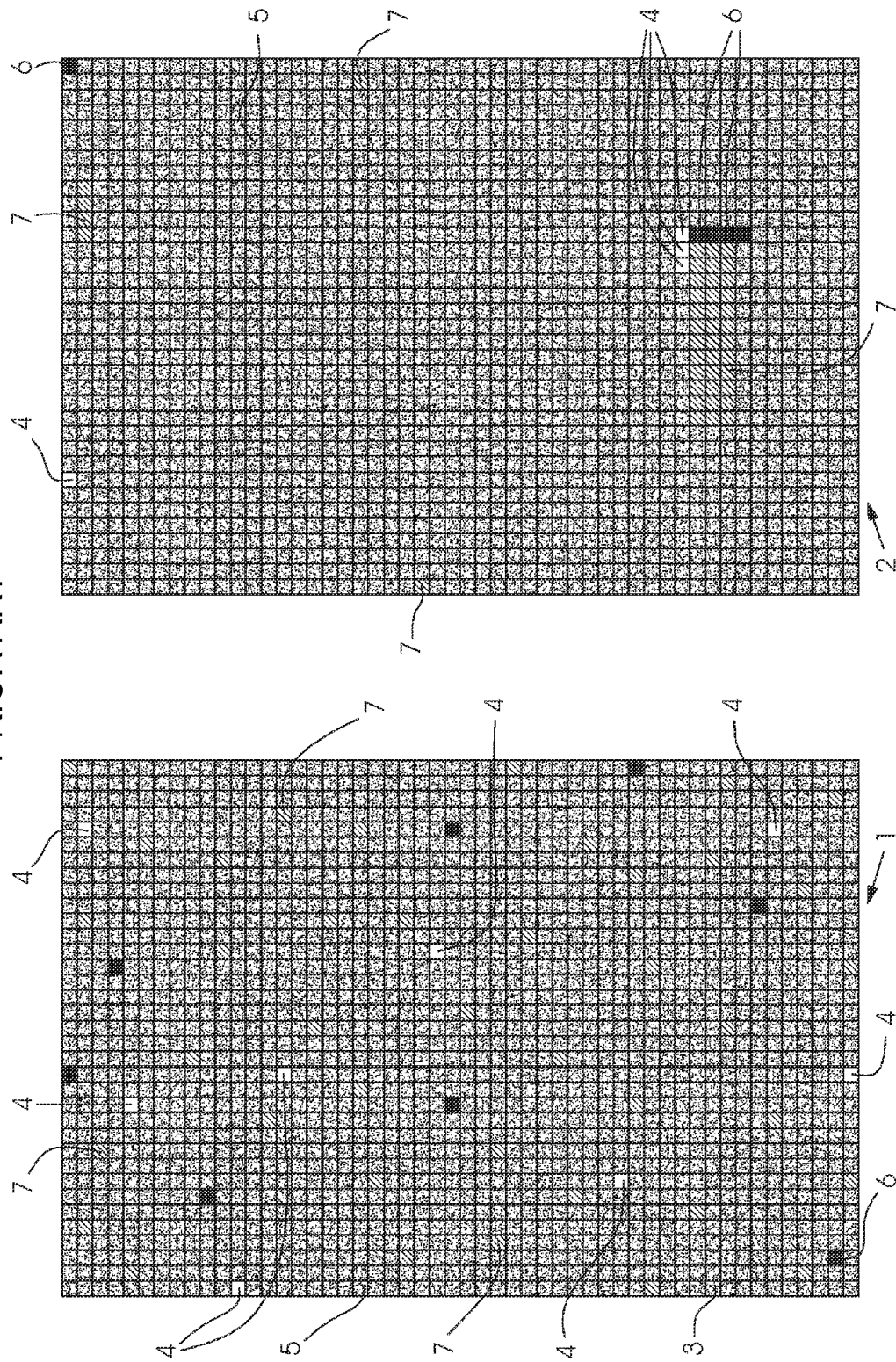
FIG. 1 is a diagrammatic, plan view of a test element according to the prior art.

Referring now in detail to the figures of the drawings, which show an example of the method according to the invention, from which further inventive features can also emerge and to which the invention is not restricted, and first, particularly, to FIG. 1 thereof, there are seen test elements 1, 2 according to the prior art, which are used to determine characterization data, for example in accordance with ISO 12642-2:2006. They are test elements for a CMYK printing process. Those test elements can, for example, also be replaced by manufacturer-specific test elements, which are needed, in particular, when using special colors.

The test elements 1, 2 are built up from colored areas 3. It is necessary overall to distinguish between colored areas 4 without coverage, i.e. white colored areas 4, colored areas 5 with mixed proportions, which are produced by overprinting different printing inks, full tone colored areas 6, which are produced by a 100% coverage of a single printing ink in each case, and tonal value colored areas 7, which are created exclusively from one printing ink. It is possible for the tonal value, on which the coverage of the covered area is based, of the individual printing ink to lie between 0 and 100%.

Such test elements 1, 2, as are shown in FIG. 1, are in general so large that at least one test form, i.e. a printing plate, has to be imaged for that purpose and is then used in a printing process in order to thereby be able to determine the characterization data of that printing process. In that case, it should be noted in particular, that, in the case of known color measuring instruments, for example spectrophotometers, the measuring area aperture has a diameter of about 3 mm, for example, so that the minimum size of an area must be at least 5×5 mm$^2$ for a reliable measurement. Consequently, the area required for such a complete test element is very large. Recording characterization data with such known test elements is very cumbersome since, when a plurality of test elements is used, to some extent the test elements and colored areas used have to be distributed to a plurality of printed sheets. Such a distribution applies, in particular, when more than four printing inks and/or special colors are used. The test elements shown herein have 1617 areas in the case of four colors.

Figure 2:
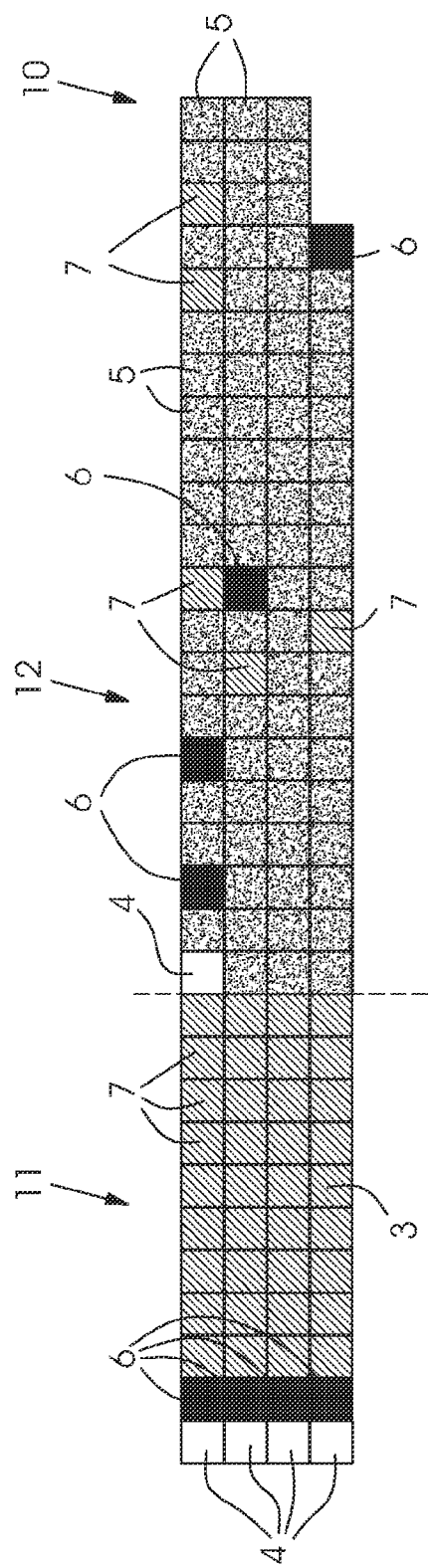
FIG. 2 is a plan view of a first test element according to the invention.
Figure 3:
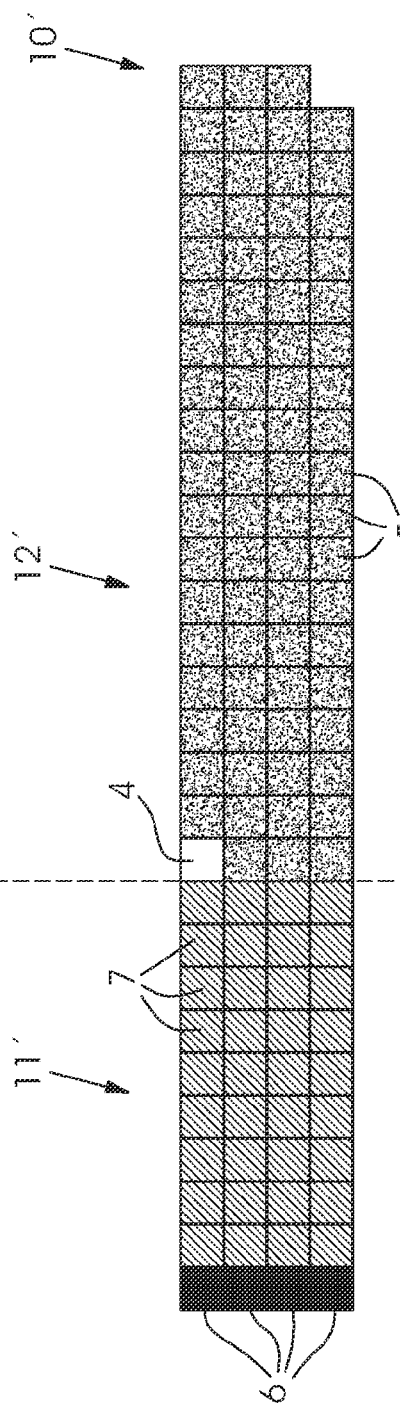
FIG. 3 is a plan view of a reduced test element.

According to the method of the present invention, a test element according to the invention, such as is illustrated in FIG. 2 or 3, for example, is now sufficient to characterize a printing process.

FIG. 2 shows a first example of a test element 10 according to the invention. This is an example of a four color system using the colors CMYK.

The test element 10 in this case is divided up into two subregions 11 and 12. These subregions 11, 12 of the test element 10 are assigned colored areas 3 in each case. The set of colored areas 3, which are assigned to one subregion 11, 12 in each case, is assigned an individual subset 54, 54 of actual data which is measured later.

The subregion 11 includes colored areas 3 which build up a stepped wedge. The colored areas 3 are in each case built up exclusively from one printing ink (CMYK) with different tonal values for this purpose. If the tonal value is 0% in each case, then four white colored areas 4 are formed. In the case of a tonal value of 100%, the result is the four full tone colored areas 6. The remaining colored areas 3 result from variations in the tonal values each having a 10% spacing of the tonal values, so that the result in this case is a total of 36 tonal value colored areas 7.

While the subregion 11 is built up from 44 colored areas in the form of a stepped wedge, the subregion 12 includes a total of 81 colored areas 3. In this case, the colored areas 3 are formed by overprinting the different printing inks (CMYK) in all of the possible combinations. The possible combinations in this case result from the number of reference points at which the tonal values of the individual printing inks (CMYK) are predefined. In the example illustrated herein, the reference points used should be color values with the values 0%, 40% and 100%, so that for each printing ink CMYK three different tonal values are available. The number of combinations of the overprinted printing inks CMYK is therefore given as 81 in accordance with the formula $k^m$, where k describes the number of printed points and m describes the number of printing inks.

Even in the possible combinations of overprinted printing inks CMYK, the result is one area having a white colored area 4, a total of four full tone colored areas 6 having a coverage of 100% in each case with only one printing ink CMYK, and four further tonal value colored areas 7 having a coverage of 40% each having only one printing ink CMYK. The remaining 72 colored areas 3 then result from mixed colored areas 5. A mixed colored area 5 is to be understood as a colored area 3 which has been printed with at least two different printing inks CMYK.

FIG. 3 shows an alternative preferred version of a test element 10'. In this case, redundant colored areas 3 in subregions 11', 12' have been struck out in each case.

Since, in both subregions 11, 12 of the test element 10, white colored areas 4 were present, in the test element 10' the white colored areas 4 have been struck out from the subregion 11, so that the reduced subregion 11' now has four full tone colored areas 6 and 36 tonal value colored areas 7. In the subregion 12', on the other hand, the four full tone colored areas 6, which are identical to the full tone colored areas 6 of subregion 11', and also the tonal value colored areas 7, which were also identical to tonal value colored areas 7 of the subregion 11', have been dispensed with, so that use is made in this case of only 72 mixed colored areas 5 and one white colored area 4, with consequently only a total of 73 colored areas being used.

The entire reduced test element 10' then includes only 113 colored areas 3 and nevertheless serves as a starting point for determining the necessary characterization data of a four color printing process.

As a result of the small extent of this reduced test element 10' but also even of the test element 10 itself, it is possible to apply these test elements 10, 10', for example even during a printing process, in an unused edge region of the printed sheet. Preferably, however, they are used in a specific test form. While for a four color print the subregion 12 includes $k^m = 3^4 = 81$ colored areas 3, a corresponding subregion 12 of a test element 10 for six printing inks with likewise 3 reference points would have $3^6 = 729$ colored areas 3.

A further reduction in the colored areas 3 can be made, in particular, for a use of more than four printing inks through the use of a color space separation, as described in German Published Patent Application DE 10 2004 001 937, corresponding to U.S. Pat. No. 7,032,517. In this case, even for a six color print, the color space is separated in a corresponding way into regions which have only three printing inks. Referring to the description of German Published Patent Application DE 10 2004 001 937, corresponding to U.S. Pat. No. 7,032,517, for this splitting of the color space, i.e. the separations described, for each of these separated color space regions it is then necessary once more to use only $k^m$, with m printing inks in the region considered and k the number of reference points, i.e. the values used in the overprinting of the different printing inks, corresponding to a total of three times $k^m = 3 \cdot 81 = 243$ colored areas 3. In each subregion or segment of the color space only three reference points are used and four printing inks are overprinted. Overprinting of more than four printing inks is not envisaged.

Figure 4:
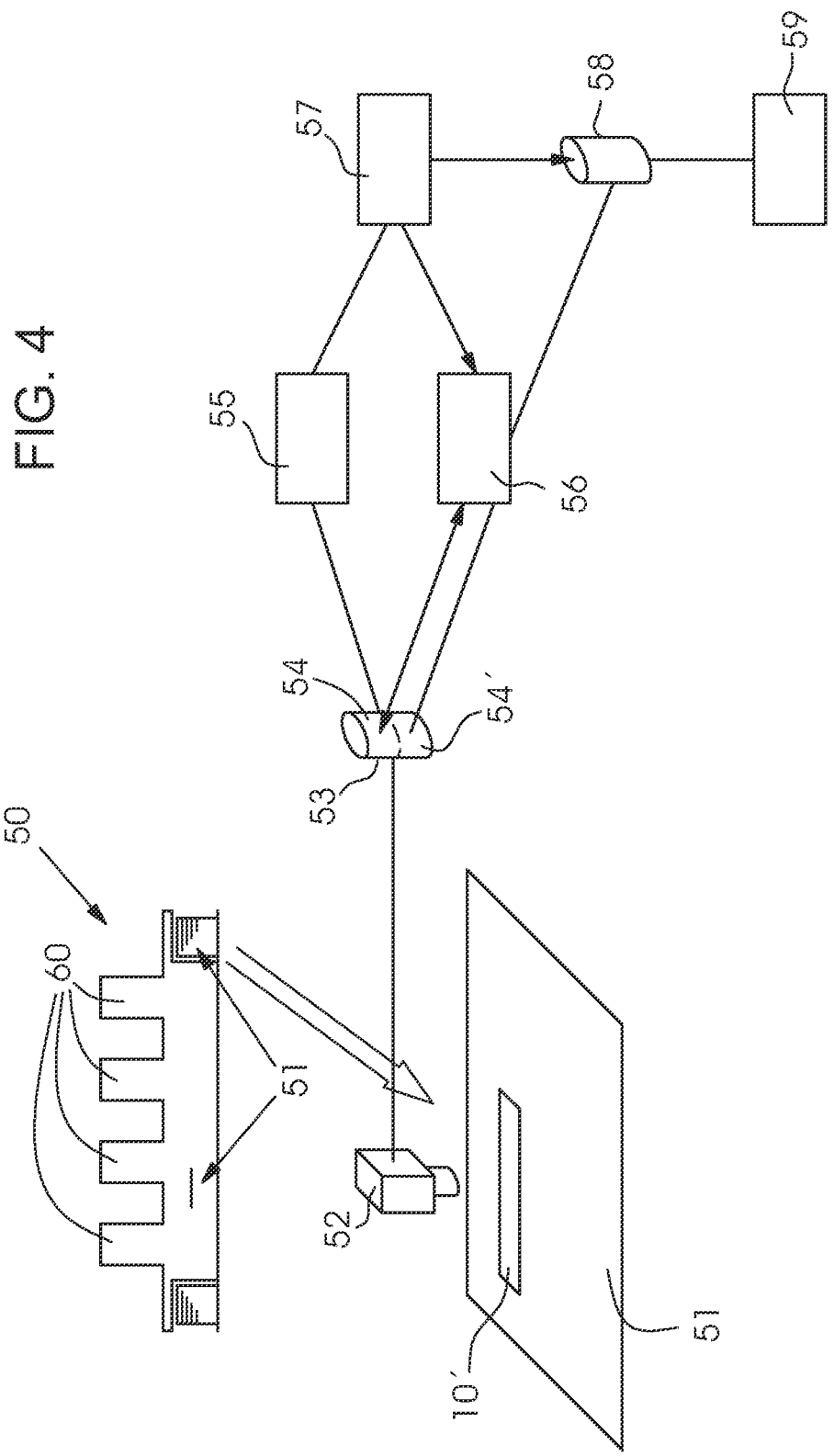
FIG. 4 is a schematic and block diagram of an apparatus for determining characterization data of a printing process.

It is seen, with reference to FIG. 4, that a test element 10, 10' as described above can be exposed independently on a printing form in a printing process for determining the characterization data of a printing press 50 and can be applied to a printed sheet 51 in the printing press 50. Alternatively, it is in particular also possible, due to the extents of the test elements 10, 10', to print the latter in an edge region of a printed sheet 51. FIG. 4 shows a corresponding structure for producing characterization data, in which a printed sheet 51 is first printed in a printing press 50 having a plurality of inking units 60, in which a reduced test element 10' is provided in an edge region of the printed sheet 51. It is preferable for care always to be taken to ensure that the test element 10' is provided in a region having an adequate ink supply.

After the printing process is carried out, the printed sheet 51 is measured in the region of the reduced test element 10' through the use of a spectrophotometer 52. The measured results determined in this way are stored in a storage device 53 as actual spectral data 54, 54'. The actual spectral data in this case are formed of a first subset 54 and a second subset 54', which can be ascribed to the respective subregions 11' and 12' of the reduced test element 10'. The colored areas 3 which have been left out in order to reduce the test element 10 to a reduced test element 10' in the respective subregion 11, 12 are then assigned to both subsets 54, 54'. This can be achieved, in particular, by duplicating the appropriate data.

The first subset 54 of the stored actual spectral data is passed on to a total value gain calculating device 55. It is alternatively possible for the tonal value gain calculating device 55 to access the data subset 54 directly. On the basis of this spectral data, densitometric, colorimetric or spectral tonal values and/or tonal value gains are obtained in accordance with known methods, in particular from the color wedges of the subregion 11' of the reduced test element 10', with recourse being, in particular, further had to the white area 4 from the subregion 12' of the reduced test element 10'.

Corresponding tonal value gain correction curves for the individual printing inks CMYK are determined through the use of suitable interpolation methods from the tonal value gains determined in this way for the individual printing inks CMYK in accordance with the color wedges of the subregion 11' or alternatively a subregion 11. In general, through the use of these color wedges 11', tonal value gain correction curves, tonal value correction curves can be determined for all of the printing inks used, that is to say even from multicolor printing systems, in particular also for special colors. When special colors are used, the spectral tonal value gain is preferably calculated from the first subset of the stored spectral data 54. The accuracy can generally be increased for all colors by using spectral tonal value gains.

Furthermore, a spectral calculating device 56 makes access to the second subset 54' of the stored actual data in the storage device 53. By using this second subset 54', which corresponds substantially to the reduced subregion 12' of the test element 10', and taking into account spectral data from colored areas 3 which, in order to reduce the test element 10', are no longer used in the subregion 12' but instead exclusively in the subregion 11' and now belong to the first data subset 54, spectra for all of the possible overprints of the various printing inks can be calculated through the use of a model stored in the spectral calculating device 56.

The model preferably used for calculating the spectra of the different overprints of printing inks is a so-called segmented spectral Yule-Nielsen Neugebauer model (CYNSN Cellular Yule-Nielsen modified spectral Neugebauer model). In addition, other models for calculating spectra from the pre-definition of measured reference points can also be used.

According to the segmented spectral Yule-Nielsen Neugebauer equation, the spectrum for a combination of printing inks in a segment of a body which is covered by the printing inks used is calculated in accordance with the following equation:

$$R(\lambda) = [\sum_{i=1}^{ND} u_i \times R_i^{1/n}(\lambda)]^n \tag{1}$$

Incidentally, the reference points $R_i$, which are the corners of the individual segments of the body of the printing inks, are defined by the predefined percentage values of the printing inks in the subregion 12 or 12' of the test element 10, 10'. In the example used, three reference points 0%, 40% and 100% are thus defined. The reference points $R_i$ correspond to the actual spectral data from the colored areas 3 at these points. In general terms, when using m printing inks in the printing process, an m-dimensional body is covered by the printing inks used, with the axes of the body in each case being formed from the spectral values which correspond to the tonal values of only one printing ink. The segmentation of this body in turn results in bodies which are defined by the reference points selected within the body of printing inks.

In the usual Neugebauer model, the reference points used are the paper white and the full tone colored areas. In the print, all of the combinations of the overprints are then additionally created appropriately for the purpose of characterization. In the case of a print having three colors, these would be $2^3=8$ combinations and in the case of a print having four colors, $2^4=16$ combinations. In general, the number of combinations results from the number of reference points per color component raised to the power of the number of color components to give $NP=k^m$.

The introduction of a further reference point (k=3), as in the segmented spectral Yule-Nielsen Neugebauer model presented, then leads to 81 combinations in the print with four colors, as mentioned. The number and distribution of the reference points for each color component should be chosen in such a way that the visually most uniform coverage possible is carried out. This is given by the proposed reference points 0%, 40% and 100%, which has been shown by empirical observation, with very good results also being achieved with 50% instead of 40%.

Depending on the printing inks used, i.e. the number thereof and the number of reference points, the number of segments or cells of the segmented model results in $Z=(k-1)^m$, with each cell once more having $NP=2^m$ reference points. The simple spectral Yule-Nielsen Neugebauer model and thus equation (1) then applies to each of these segments, with the index i referring to the parameters of a segment. The number of parameters of the segment NP is given by $NP=2^m$ with m as the number of printing inks. The reference points are therefore defined by the overprinting of two possible printing inks.

The values $\alpha_i$ are the so-called Demichel coefficients. For instance, when three printing inks, e.g. CMY, are used, they are given by the equations:

$$\alpha_1(CMY)=(1-c_l)(1-m_l)(1-y_l)$$

$$\alpha_2(CMY)=(c_l)(1-m_l)(1-y_l)$$

$$\alpha_3(CMY)=(1-c_l)(m_l)(1-y_l)$$

$$\alpha_4(CMY)=(c_l)(m_l)(1-y_l)$$

$$\alpha_5(CMY)=(1-c_l)(1-m_l)(y_l)$$

$$\alpha_6(CMY)=(c_l)(1-m_l)(y_l)$$

$$\alpha_7(CMY)=(1-c_l)(m_l)(y_l)$$

$$\alpha_8(CMY)=(c_l)(m_l)(y_l) \tag{2}$$

The effective area coverages $c_l$, $m_l$ and $y_l$ of the half tones have to be normalized for the calculation:

$$c_l=(C-0)/(Cs-0) \text{ for } C<Cs$$

$$=(C-Cs)/(100-Cs) \text{ for } C \geq Cs$$

$$m_l=(M-0)/(Ms-0) \text{ for } M<Ms$$

$$=(M-Ms)/(100-Ms) \text{ for } M \geq Ms$$

$$y_l=(Y-0)/(Ys-0) \text{ for } Y<Ys$$

$$=(Y-Ys)/(100-Ys) \text{ for } Y \geq Ys \tag{3}$$

with Cs, Ms, Ys being the tonal values of the segment partition.

A restriction to three printing inks has been made in this case for clarity. In the event that four or more printing inks are used, for example additionally the use of the printing ink K as in the above example, the factors $k_l$ and $(1-k_l)$ are added appropriately, so that in the case of 16 reference points $R_i$ a total of 16 Demichels coefficients $\alpha_i$ are provided.

The effective area coverages $c_l$, $m_l$ and $y_l$ of the half tones describe the relative area coverage of the printed dot which would lie within a corresponding segment. Therefore, through the use of equation (1) and on the basis of the measured spectra $R_i$ of the k reference points which have been determined on the colored areas 4, 5, 6 and 7 of the subregion 12 or 12' of a test element 10 or 10', the spectra of any desired tonal value combinations within a segment can now be calculated.

Through the use of these stipulations which, as described, can easily be widened to four and more colors, the spectral values R(λ) can then be calculated for all of the printing ink combinations within a segment. In this case, the factor n according to formula (1) is intended to take optical image point enlargement into account.

According to the example presented in this case, the factor n is determined by calculating the spectra of the tonal value colored areas 7 of the subregions 11, 11' and/or 12, 12' in accordance with the segmented spectral Yule-Nielsen Neugebauer model. If further color wedges or test elements are used on the same test form or printing form, then, in addition or alternatively, colored areas from these test elements can also be used to determine the factor n.

For this purpose, firstly an arbitrary value is set for n, with the value n=2 being preferred as a starting point. The factor n is adapted, by iteratively changing the factor or parameter n, in such a way that the differences between the calculated spectra R(λ) and the measured spectra of the colored areas 7 or all of the colored areas 7 of the subregion 11, 11' and/or 12, 12' are minimized. In this case, n can be minimized in total over all of the colored areas 3 of a subregion or for the individual colors of the subregion 11, 11' and averaging can then be carried out in this case.

Since the factor n determined in this way is still only a model, it is not yet possible for all of the colored areas 3 of test elements 1, 2 to be calculated sufficiently accurately through the use of this method thus described in order to characterize a printing process.

As a result of additionally taking the tonal value gains or tonal values or a tonal value gain curve into account, such as results from the colored areas 3 of the subregions 11, 11', the segmented spectral Yule-Nielsen Neugebauer equation according to equation (1) can be adapted to such an extent that all of the colored areas 3 of test elements 1, 2 for characterizing a printing process can be calculated with sufficient accuracy, i.e. the spectral Yule-Nielsen Neugebauer equation used in the model can be used jointly, taking into account the tonal value gain curve correction according to the colored areas 3 of the subregions 11, 11' on its own to calculate all of the necessary characterization data of a printing process, so that the small test elements 10, 10' are sufficient to characterize the printing process. These can be prepared accordingly on a test form, jointly with still further test elements, for further determinations. The small test elements 10, 10' can therefore advantageously replace the large test elements 1, 2 completely without sacrificing accuracy.

The tonal value gain correction curve according to the subregions 11, 11' is determined as described in the tonal value gain calculating device 55. For predefined tonal value combinations of the printing inks, e.g. CMYK, for example for colored areas of a test element 1, 2, according to the invention these tonal values are no longer used directly in the Yule-Nielsen Neugebauer equation as a constituent part of the Demichel coefficients according to equations 2 and 3. Instead, these tonal values CMYK are first corrected in accordance with the tonal value gain curve established and calculated. This is done in a tonal value gain correcting device 57, which transfers the tonal values C'M'Y'K' corrected in this way as input variables for the effective area coverages $c_j$, $m_j$, $y_j$ and $k_j$ of the Demichel coefficients of the Yule-Nielsen Neugebauer equation to the calculating device 56. It is only on the basis of these tonal value gain-corrected tonal values C'M'Y'K' that the spectra of the predefined printing ink combinations are determined by the calculating device 56 in accordance with the model outlined above. The spectra R(λ) calculated in this way for the tonal value combination $C_bM_bY_bK_b$, together with the predefined tonal value combination CMYK, are then made available as characterization data in a storage device 58. Through the use of this characterization data, profilings of a printing process can subsequently be carried out in a calculating device 59, and process calibrations or process controls can be applied.

As already described, this method can easily be expanded, with an appropriate adaptation of Demichel coefficients and reference points $R_i$, to multicolor systems, in particular, with special colors.

Thus, in a straightforward manner by using tonal value gain correction curves in a tonal value gain calculating device 55 for the use of predefined color values of different printing inks in a spectral model of the printing process, in this case the segmented spectral Yule-Nielsen Neugebauer model, the necessary number of colored areas 3 of a test element 10, 10' is very highly reduced and simplified since it has been shown experimentally that, as a result of this interaction with the additional tonal value gain correction curve, in particular all of the spectral values of the colored areas 3 of test elements 1, 2 according to the prior art can be calculated sufficiently accurately enough, and thus all of the tonal value combinations lying inbetween can be determined correspondingly accurately. Thus, this data is completely sufficient to characterize a printing process. Instead of the use of tonal value gain correction curves, it is of course also possible to use both the predefined tonal values and the tonal values determined from the color values determined as a basis for a corresponding calculation.

The invention claimed is:

1. A method for determining characterization data for use in a printing process, the method comprising the following steps:
   initially printing at least one test element, having a number of colored areas, on a printing material;
   assigning tonal values of at least one printing ink to the colored areas;
   measuring the colored areas of the at least one test element with a spectral measuring instrument to determine measured results;
   storing the measured results as actual spectral data;
   determining a first tonal value gain for the assigned tonal values of the colored areas of a first subset of the actual data;
   determining a first tonal value gain curve or tonal value curve by interpolation from the first tonal value gains of the assigned tonal values;
   determining at least one parameter of a model for calculating color values of the printing process using a second subset of the actual data;
   determining at least one of a second tonal value curve or tonal value gain curve for the printing process from the model;
   comparing the first and second tonal value curves or tonal value gain curves with one another; and
   determining a correction curve for adapting the tonal values of the model from the first tonal value curve or tonal value gain curve, and calculating characterization data of the printing process using the model while taking the correction curve into account.

2. The method according to claim 1, which further comprises using the spectral Yule-Nielsen Neugebauer model as the model, and iteratively determining a factor n for modeling a point enlargement with at least one subset.

3. The method according to claim 2, wherein the spectral Yule-Nielsen Neugebauer model is the segmented spectral Yule-Nielsen Neugebauer model.

4. The method according to claim 1, which further comprises calculating densitometric, colorimetric or spectral first tonal values or tonal value gains from the first subset.

5. The method according to claim 4, which further comprises calculating spectral tonal values or tonal value gains when special colors are used, at least in the case of color values, of the colored areas having special colors.

6. The method according to claim 1, which further comprises forming the first subset of data from color wedges.

7. The method according to claim 6, which further comprises forming the color wedges of colored areas formed exclusively by one printing ink and based on tonal values having spacings of 10%.

8. The method according to claim 1, which further comprises:
forming the second subset of data from colored areas formed by overprinting printing inks being used;
carrying out printing with m printing inks;
printing the printing inks in accordance with tonal values selected from a predefined selection of k reference points; and
overprinting the printing inks in accordance with every possible combination of the reference points, so that $k^m$ combinations of overprinted printing ink coverages are possible.

9. The method according to claim 8, which further comprises presenting 0%, 40% and 100% reference points for selection.

10. The method according to claim 8, which further comprises:
forming the first subset of data from color wedges;
providing the at least one test element with colored areas in color wedges to determine data of the first subset and colored areas to determine data of the second subset;
reducing the set of colored areas for determining the first or second subset by colored areas already being used to determine the second or first subset;
printing the colored areas only in a subregion of the test element and using the colored areas to determine both subsets or using colored areas for determining the first or second subset based on the same tonal values both for determining the first and the second subset; and
averaging for the colored areas.

11. The method according to claim 10, which further comprises carrying out the averaging for multiply printed colored areas.

12. The method according to claim 1, which further comprises:
storing the characterization data;
creating a color profile of the printing process, at least by using the characterization data; and
using the color profile for color control of a printing press for the printing process.

13. The method according to claim 1, which further comprises:
providing a test element for determining characterization data, the test element having:
a first set of colored areas formed in accordance with a color wedge;
the colored areas each being printed with only one respective printing ink based on tonal values having a predefined mutual spacing;
a second set of colored areas formed by overprinting printing inks in accordance with tonal values, selected from a predefined reference selection of k reference points;
the printing inks being overprinted in accordance with every possible combination of the reference points; and
at least one of:
the first set of colored areas being reduced by not providing colored areas already contained in the second set, or
the second set of colored areas being reduced by not printing colored areas already contained in the first set.

14. The method according to claim 13, wherein the predefined mutual spacing is 10% steps.

15. The method according to claim 13, wherein the reference points are three predefined reference points.

16. The method according to claim 15, wherein the three predefined reference points are 0%, 40% and 100%.

17. The method according to claim 13, wherein at least one of white colored areas having a coverage of 0% are left out of the first set or colored areas built up exclusively from one printing ink are left out of the second set.

18. An apparatus for determining characterization data for use in a printing process, the apparatus comprising:
a printing press for printing printing materials with at least one test element;
a measuring device for measuring spectral data of colored areas of the test element;
a storage device for storing data subsets of the spectral data;
a tonal value gain calculating device for calculating a tonal value curve or tonal value gain curve from a first subset of the stored data;
a calculating device for calculating spectra for tonal value combinations in accordance with a model of a printing process;
said calculating device determining at least one parameter of the model while taking at least one of a first or a second subset into account;
said tonal value gain calculating device determining corrected tonal values in accordance with a tonal value curve or tonal value gain curve;
said calculating device using the corrected tonal values as input variables for determining corrected tonal values or their spectra; and
a calculating device using the corrected tonal values or their spectra to calculate characterization data of the printing process with the model.

19. The apparatus according to claim 18, wherein the apparatus is configured to carry out the following steps:
initially printing at least one test element, having a number of colored areas, on a printing material;
assigning tonal values of at least one printing ink to the colored areas;
measuring the colored areas of the at least one test element with a spectral measuring instrument to determine measured results;
storing the measured results as actual spectral data;
determining a first tonal value gain for the assigned tonal values of the colored areas of a first subset of the actual data;
determining a first tonal value gain curve or tonal value curve by interpolation from the first tonal value gains of the assigned tonal values;
determining at least one parameter of a model for calculating color values of the printing process using a second subset of the actual data;
determining at least one of a second tonal value curve or tonal value gain curve for the printing process from the model;
comparing the first and second tonal value curves or tonal value gain curves with one another; and determining a correction curve for adapting the tonal values of the model from the first tonal value curve or tonal value gain curve, and calculating characterization data of the printing process using the model while taking the correction curve into account.

* * * * *